May 7, 1940.  W. O. BROWN  2,199,876
JUICE EXTRACTING MACHINE
Filed March 22, 1937  6 Sheets-Sheet 1

Fig. 1.

Inventor
William O. Brown
By
Attorney

Fig. 2.

Inventor
William O. Brown

May 7, 1940. W. O. BROWN 2,199,876
JUICE EXTRACTING MACHINE
Filed March 22, 1937 6 Sheets-Sheet 3

Fig. 3.

Inventor
William O. Brown
By [signature]
Attorney

May 7, 1940.  W. O. BROWN  2,199,876
JUICE EXTRACTING MACHINE
Filed March 22, 1937   6 Sheets-Sheet 4

Fig. 4.

Inventor
William O. Brown
By
Attorney

Inventor
William O. Brown
By [signature]
Attorney

Patented May 7, 1940

2,199,876

UNITED STATES PATENT OFFICE 2,199,876

JUICE EXTRACTING MACHINE

William O. Brown, Los Angeles, Calif.

Application March 22, 1937, Serial No. 132,194

19 Claims. (Cl. 146—3)

It is a primary object of the present invention to produce a machine of the class described which is of simple form and construction, being entirely automatic in its operation and which halves the fruit by slicing the fruit and extracting therefrom the maximum quantity of juice with a minimum contamination of the juice with the fibers or skin of the fruit.

The machine first prepares the fruit for the extraction of the juice by slicing the fruit into halves, the slicing taking place in a vertical plane, the halves of the fruit then being turned so that the fruit is placed in a position with the cut face of the fruit downwardly, in which position the fruit is engaged by suitable cups, and while in such engaged position, the reaming operation is performed, thereby permitting the maximum quantity of juice to flow unobstructed from the fruit.

A further object of the invention is to provide a rigid support for the fruit holding cups during the reaming operation, the cups being inverted and so arranged with relation to the reaming means that the incoming halved fruit is clamped in the cups and held therein until the reaming operation has been completed.

A further object is to provide a machine of the class described, automatic in operation, in which the fruit holding or clamping cups are so constructed and arranged with relation to the reaming means that various sizes of fruit or what is known as orchard run of fruit may be handled on the machine without any adjustment.

Another object of the present invention is to construct a machine of the class described in which the various units are so arranged that the cup unit may readily be detached and other parts of the machine made readily accessible.

Other objects and advantages will appear hereinafter from the following description and drawings.

Referring to the drawings, which are for illustrative purposes only—

Figure 1:
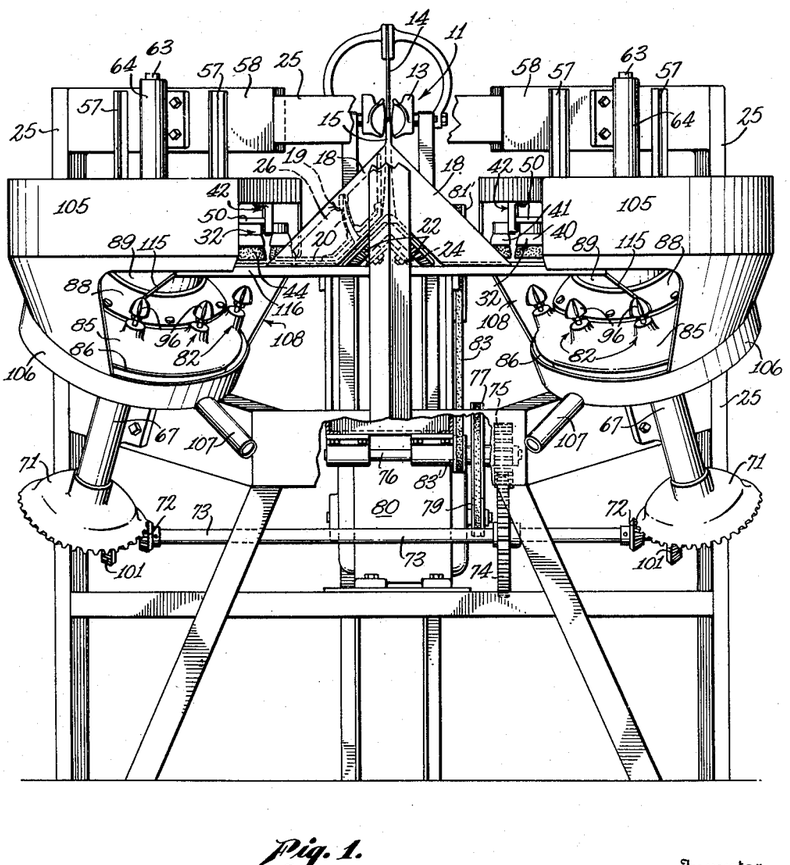
Fig. 1 is a face view of a machine embodying the preferred form of my invention, a portion of the parts shown being broken away to better illustrate the mechanism employed.
Figure 2:
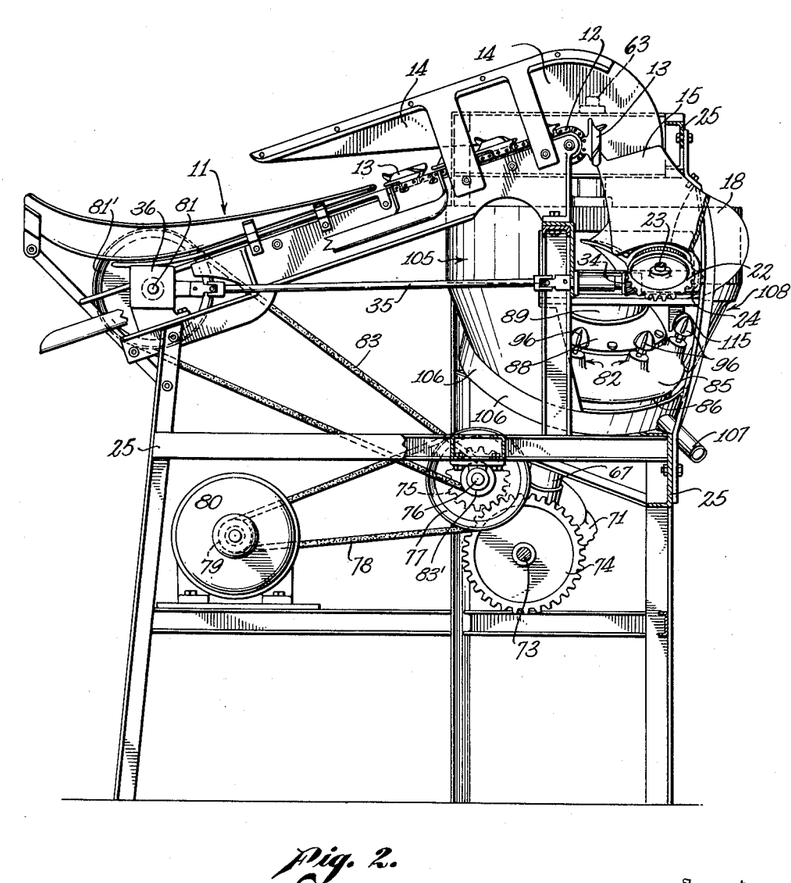
Fig. 2 is a side elevation of the machine shown in Fig. 1, certain parts being shown in section.

More particularly referring to the drawings and with special reference to Fig. 2, the fruit conveying mechanism generally indicated at 11 is of the same character and construction as that shown in my co-pending application, above referred to, a chain conveyor 12 being employed provided with cups 13 which carry the fruit into engagement with a vertical stationary knife indicated at 14. This knife 14 halves the fruit, the halves being separated and directed in opposite directions by a separator or deflector indicated at 15.

It is to be understood that the machine is built in duplex one half of the fruit going to one side of the machine and the other half to the other. As the mechanism on each side of the machine for handling the halved fruit after being so directed being of the same construction, it is to be understood that in the following description that the machine as described with respect to the handling of one half of the fruit, is duplicated on the other side of the machine.

The separator on each side of the machine consists of a curved plate 18 which curves from a vertical plane at the knife 14 to a horizontal plane at its discharge end indicated at 18'. The halves of the fruit are caused to travel around the plate 18 by means of a feeder 19 consisting of a plurality of curved arms 20 secured to a plate 21 which in turn is fixed to the hub of a gear 22 on a shaft 23 journaled in a cross member 24 of the frame 25 (see Fig. 12). The arms 20 extend outwardly and are curved rearwardly at their outer ends, the arms engaging the halves of the fruit on the plate 18 and pushing or sweeping them from the plate 18 on to a stationary platform 30 and into the path of cups generally indicated at 32 which are in open position as they advance on the fruit at this point.

The space between the arms 20 is formed into pockets by webs 26 of sheet metal which extends between and are fixed to the respective arms. These pockets insure that the halves of fruit are retained on the plate 18 as the high speed of the machine, approximately 300 oranges per minute, causes the halves of fruit to travel around the plate at great velocity.

Each of the feeders 19 is rotated by means of a gear 22 on the shaft 23, the two gears 22 being in engagement with each other and one of the gears being engaged by a beveled pinion 34 driven by a shaft 35 from a gear box 36 (see Fig. 2). It is to be understood that the halves of the fruit are delivered to the stationary platform 30 with the cut surface of the fruit resting on the platform and as indicated above, the fruit is then in the path of the open cups.

Figure 3:
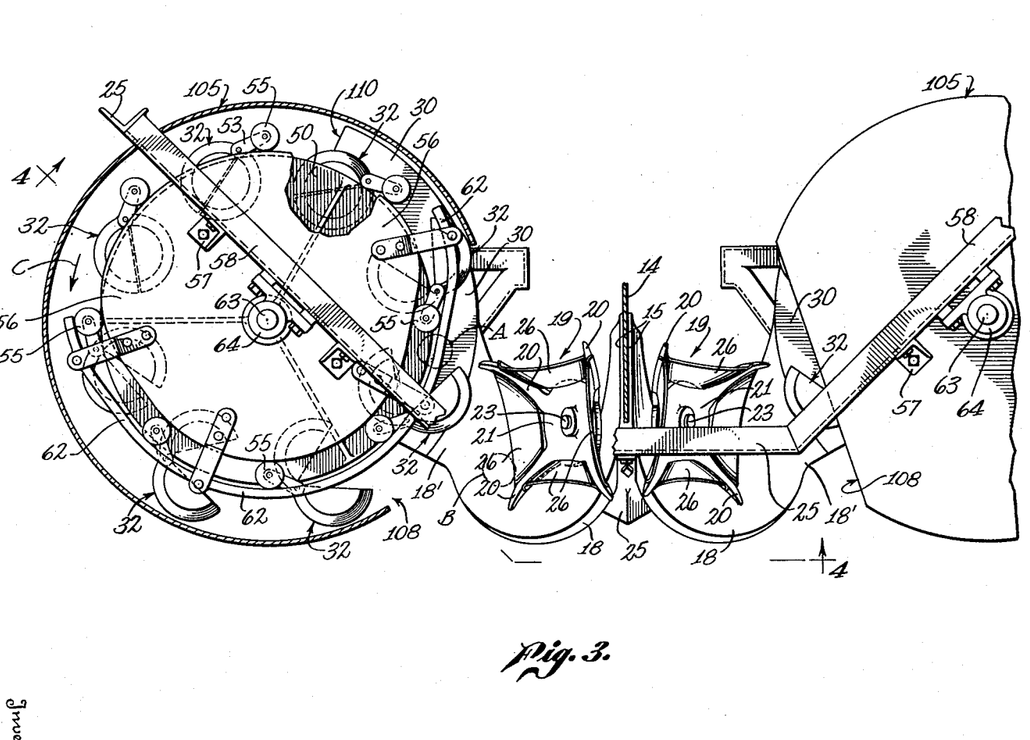
Fig. 3 is a plan view of the machine shown in Fig. 1, a portion of the machine being broken away.

These cups generally indicated at 32, are formed in two halves, a fixed half indicated at 40 and a movable half indicated at 41 hinged to the fixed half and supported thereon by means of a hinge or pivotal connection generally indicated at 42. Each half of a cup consists of a metal cap indicated at 43, semi cylinder in form, which receives therein the upper portion of the cup body 44 indicated at 45, being attached thereto by means of pins 46. The body of the cup 44 is preferably formed of a rubber composition or similar material and is provided on its inner face with scoring indicated at 47. The fixed half of the cup, indicated at 40, is secured to a revolving cup carrying disk 50 or by welding and the movable half 41 of the cup is provided with a pivot member 52 having a latterly extended arm 53 in which is journaled a shaft 54 carrying a roller 55 which engages a fixed cam plate indicated at 56 supported on legs 57 mounted on a cross bar 58 of the frame 25. The pivot member 52 is mounted on a shaft on pin 60 mounted in a bearing member 61 formed on the metal cap 43 of the fixed half of the cup. The outer edge of the cam plate is shaped so that as the rollers 55 travel around the cam plate the cups are caused to open and close as the cups are carried in their circular path by the cup plate 50. Positive movement of the opening of the cups is insured by a cam rail 62 (see Fig. 3) secured to the cam plate 56 and shaped to conform to the cam face. The cup plate or supporting member 50 is keyed to a vertical shaft 63 mounted in a suitable bearing 64 on the cross bar 58 frame of the machine.

Disposed below the lower end of shaft 63 and extending angularly with respect thereto, is a reamer unit driving shaft 65 mounted in a sleeve 66 which in turn is mounted in a bearing 67 supported on the frame of the machine. The sleeve 66 is provided with a circular flange 68 to which is attached by means of bolts 69 a circular reamer spindle carrying frame 70. The frame 70 is driven by means of a gear 71 from a gear 72 on drive shaft 73, which shaft 73 is driven by means of a gear 74 meshing with a gear 75 fixed on a shaft 76. The shaft 76 is driven by means of sprocket wheel 77, sprocket chain 78 and sprocket wheel 79 on the shaft of a motor diagrammatically shown at 80. Mounted on the frame 70 are a plurality of reamer units 82, there being one reamer unit for each cup 32. As particularly illustrated in Fig. 4, the spindle carrying frame 70 consists of a base plate 84 having formed thereon a circular angularly disposed juice deflecting plate 85 terminating outwardly in a circular rim 86. Secured to the upper circular edge of the plate 85 by means of bolts 87 is a circular head or cap 88 to which is bolted a universal joint member 89 which engages within a depending circular flange 90 formed on the cup supporting member 50. Secured to the joint member 89 is a gear 91 which meshes with a gear 92 fixed on the shaft 63 so that the cup plate, or carrier, is rotated in synchronism with the frame spindle carrying the reamer spindle units 82.

95 represents the reamer spindles, each of which has its lower end journaled in the plate 84 and extends upwardly through a bushing in the deflector plate 85.

Figure 4:
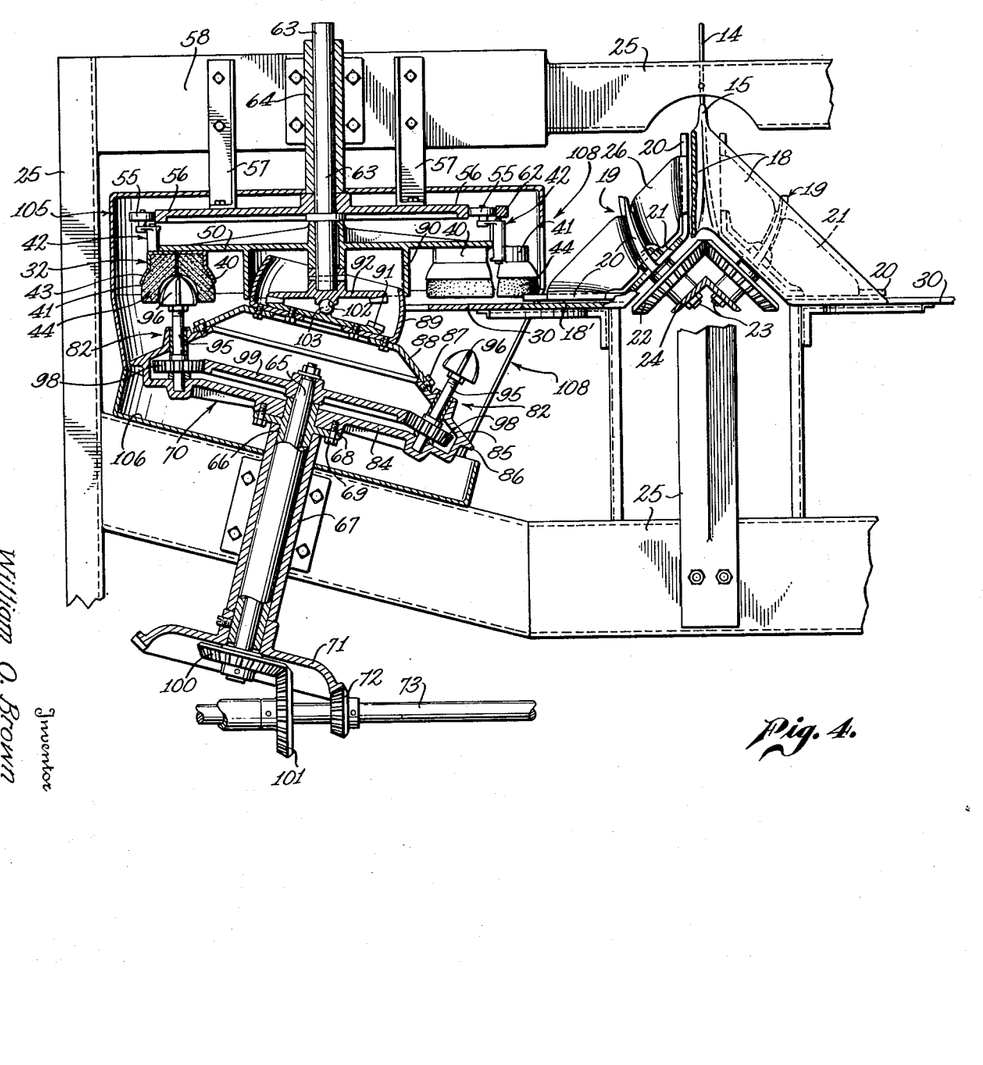
Fig. 4 is a vertical sectional view on line 4—4 of Fig. 3.
Figure 5:
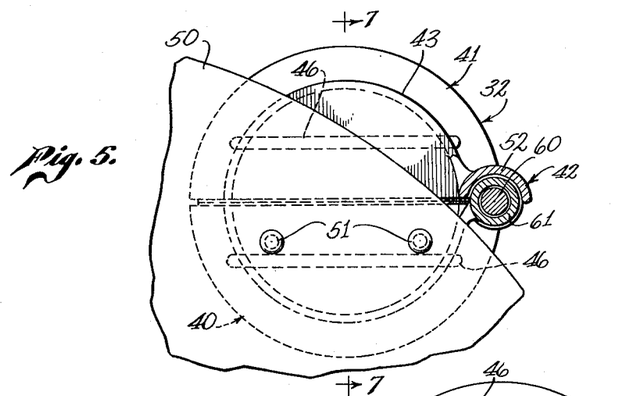
Fig. 5 is a plan view of one of the fruit receiving cups, the jointed portions of the cup being shown in section and the halves being shown in closed position.
Figures 6, 7:
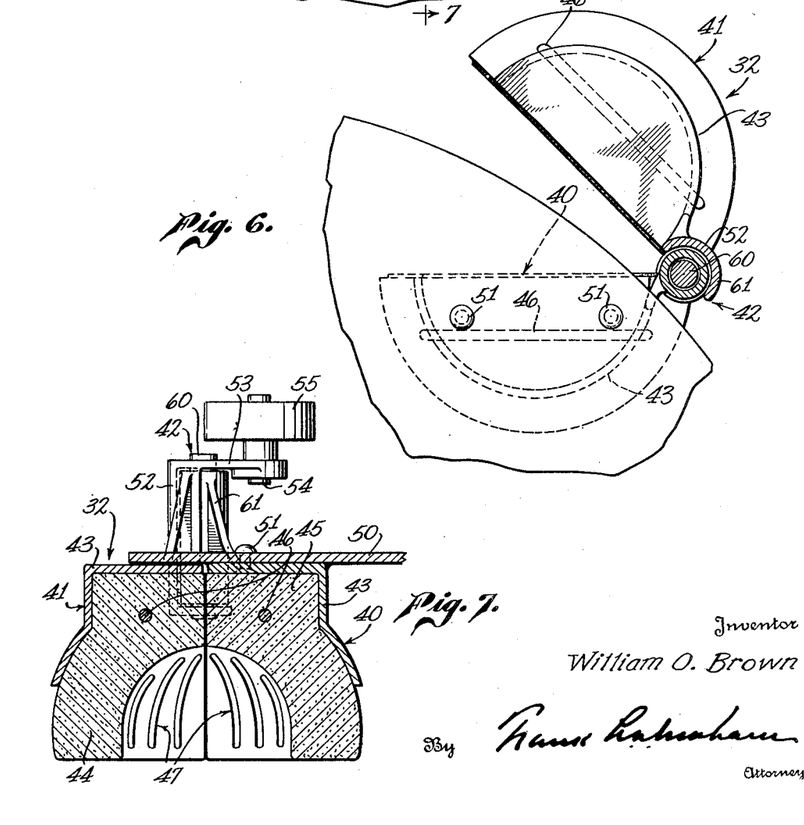
Fig. 6 is a plan view similar to Fig. 5 showing the halves of the cup in open position.
Fig. 7 is a vertical section on line 7—7 of Fig. 5.

Mounted on the upper end of each spindle 95 is a reamer or burr 96 which may be of any desired construction, the position of the reamer 96 being such that when the parts are in the position shown in Fig. 4, the reamer on the high side of the spindle carrying frame 82, is within one of the cups as shown. For the purpose of rotating the reamers, each reamer spindle 95 is provided with a gear 98 which meshes with a gear 99 secured to the end of shaft 65 which extends through the sleeve 66, the shaft 65 being driven by means of a gear 100 which meshes with and is driven by means of a gear 101 on driving shaft 73. The gear 92 on the lower end of shaft 63 is provided with a rounded seat 102 which receives a ball 103 formed on gear 91 thereby providing a ball joint which together with the joint member 89 and flange 90 serve to center the cup unit and reamer unit and maintain such members in proper relation to each other.

The cup unit and reamer unit are enclosed in a casing 105 the lower portion of which forms a pan 106 to catch the juice from which the collected juice flows by means of a drain pipe 107 to a receptacle, not shown. The casing 105 is cut away as indicated at 108 to permit entry of the fruit above the stationary platform 30 and the discharge of the skin of the fruit after removal of the juice.

The machine operates in the following manner:

The fruit being halved by the knife 14 as it is moved thereon by the conveyor 12, the halves are separated by the curved plates 18, each half being moved on its respective plate by the feeder 19, the arms of which sweep the fruit on its cut face onto a horizontally disposed platform 30. The platform 30 extends under the cups 32 as they rotate with the revolving cup carrier or supporting disk 50. As indicated in dot and dash lines on Fig. 3, the half of fruit indicated at A is in front of an open cut and the next half of fruit indicated at B is about to be pushed into the path of the next cup by one of the arms 21 on the feeder 19, it being understood that the cups rotate in the direction of the arrow indicated at C shown in Fig. 3.

The cup having received the half of fruit closes upon the fruit by reason of the roller 55 on the cup engaging the cam plate 56 and when the fruit is firmly engaged by the cup it passes beyond the end 110 of the platform 30.

Figures 8, 9, 12:
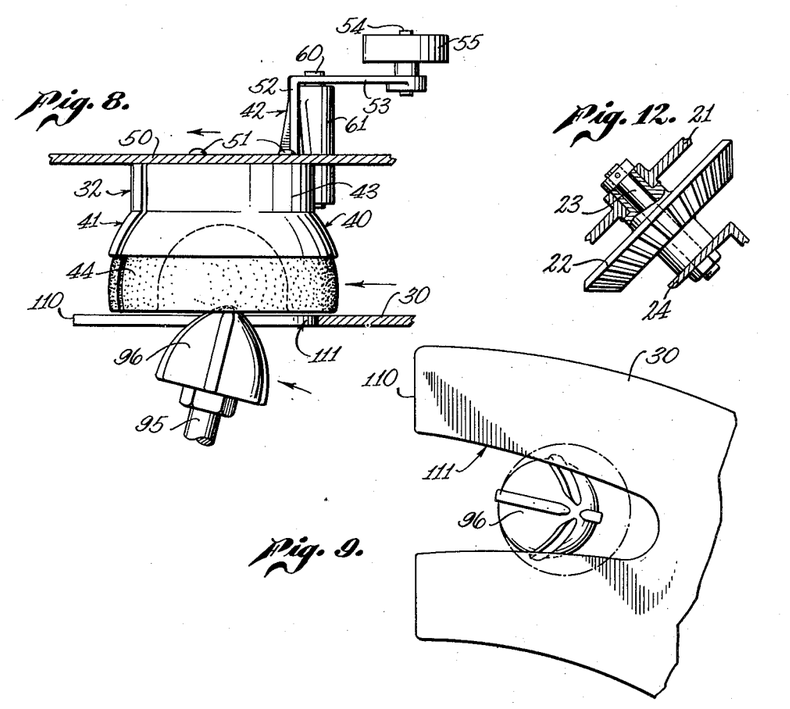
Fig. 8 is an enlarged fragmentary sectional view showing one of the cup units as it approaches the end of the fruit supporting platform.
Fig. 9 is a plan view of the end of the platform showing a reamer thereunder.
Fig. 12 is a side view partly in section showing a portion of the feeder.
Figures 10, 11:
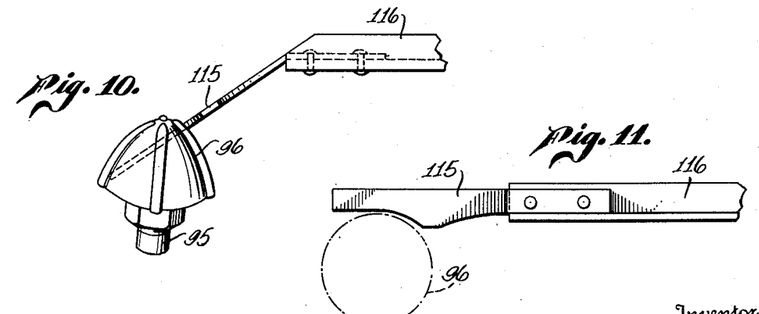
Fig. 10 is a side view of a peel stripping knife and one of the reamers.
Fig. 11 is a plan view of the knife shown in Fig. 10.

As shown in Figs. 8 and 9, the end of the platform is notched as indicated at 111 and as the cup moves the fruit over the notch or opening 111, the reamer associated with the particular cup holding the fruit, starts to enter the fruit as shown in Fig. 8 so that when the cup with the fruit therein has passed beyond the end of the platform the reamer is in such engagement with the fruit that the fruit is maintained in the cup until the reaming operation is completed. It is to be understood that the halves of the cups and that the engagement of the reamer with the fruit before the fruit leaves the end of the platform is not necessary for holding the fruit in the cup but in the event that the fruit is of such small size as to be not firmly clamped in the cup the engagement of the fruit by the reamer as above described, insures that the fruit will be held in proper position during the reaming operation. After the reaming operation in most instances the opening of the cups permits the rind or peel of the fruit to fall out of the cups and be discharged over the edge of the plate 85 of the reamer unit, but in the event that the rind of the fruit should remain on the reamer, I have provided a knife or stripping blade indicated at 115, mounted on a bar 116 secured to the frame in any suitable manner. This bar extends angularly illustrated in Figs. 10 and 11, and being a stationary blade, cuts or strips any rind from the reamer which may happen to be thereon.

After the reamer 96 enters the fruit, as above described, the path of travel of the reamers being angularly disposed with relation to the horizontal path of travel of the cups 32 the continued circular movement of the reamers and their associated cups causes the reamer to enter the fruit in the cup and due to the squeezing action of the reamer against the fruit and the rotation of the reamer the juice is extracted from the fruit and falling down upon the juice deflecting plate 85 is delivered into the pan 106. The reamer, on the high side as shown in Fig. 4, has entered the cup to its greatest extent and the continued circular movement of these elements causes the reamers to move out of the cups and the cups to open by reason of the cam movement, above described.

I claim as my invention:

1. In a citrus fruit juice extracting machine, the combination of: a rotatable cup carrier; a plurality of inverted cups mounted on said carrier; means for opening and closing the cups; means for delivering fruit sections to the cups; a tilted reamer carrier under said cup carrier rotatable in a path angularly disposed with relation to the path of travel of said cups; reamers on said reamer carrier projecting upwardly and positioned to enter the cups during a portion of their path; means for rotating said carriers; and means for rotating said reamers.

2. In a citrus fruit juice extracting machine, the combination of: a horizontally disposed rotatable cup carrier; a plurality of inverted cups mounted on said carrier extending downwardly therefrom; means for opening and closing said cups; means for delivering fruit sections to the cups when in open position; a tilted reamer carrier below said cup carrier rotatable in a path angularly disposed with relation to the path of travel of the cups; reamers mounted on said reamer carrier arranged to enter said cups during a portion of the travel of said cups when the path of travel of the reamer carrier approaches the path of travel of the cups; means for rotating said carriers; and means for rotating said reamers.

3. In a citrus fruit juice extracting machine, the combination of: a cup carrier adapted to travel in a circular path; a plurality of inverted split cups mounted on the carrier; means for driving said carrier; means for delivering fruit sections into said cups at one region of said path; means for closing said cups on said fruit sections and subsequently opening said cups to loosen fruit peels therein; a tilted reamer carrier, the axes of said cup carrier and reamer carrier being angularly disposed with relation to each other, and reaming means on said reamer carrier projecting upwardly and positioned to enter and leave said cups as they travel between the delivery and discharge regions for extracting the juice from fruit sections contained therein.

4. In a citrus fruit juice extracting machine, the combination of: a rotatable carrier; a plurality of inverted split cups mounted on and depending downwardly from said carrier; means for rotating said carrier; means for opening and closing said cups; means for delivering fruit sections to said cups when in open position; a tilted rotatable reamer carrier angularly disposed with relation to said first named carrier; reamers on said reamer carrier projecting upwardly and positioned to enter the cups when said cups are in closed position for extracting the juice from the fruit sections in the cups; means for rotating the reamer carrier and means for rotating said reamers, said carriers having their axes angularly disposed with relation to each other.

5. In a citrus fruit juice extracting machine, the combination of: a cup carrier rotatable in a horizontal plane; a plurality of inverted split cups mounted on the carrier extending downwardly therefrom; a stationary platform extending under said cups during a portion of their travel; means for delivering fruit sections onto said platform into the path of said cups; means for opening said cups to receive said fruit sections and later closing the cups; a tilted rotatable-reamer carrier; and reaming means on said carrier projecting upwardly and positioned to enter the cups when the cups are in closed position to extract juice from the fruit sections therein.

6. In a citrus fruit juice extracting machine, the combination: a rotatable cup carrier; means for rotating said carrier; inverted sectional cups; means for securing one section of each cup to the underside of said carrier; a laterally movable section of each cup pivotally connected to the section secured to the carrier; fixed cam means; means on each movable cup section engageable with said cam means, such cam means being shaped to cause a successive opening and closing of the cups when so engaged; a stationary platform under the cups, means movable over the platform for delivering fruit sections to said cups when in open position; and reaming means arranged to enter said cups when said cups are in closed position and extract the juice from the fruit sections therein.

7. In a citrus fruit juice extracting machine, the combination of: a rotatable cup carrier; means for rotating said carrier; a plurality of inverted sectional cups; means for securing one section of each cup to the underside of said carrier; a movable section of each cup pivotally connected to the section secured to the carrier; fixed cam means; means on each movable cup section engageable with said cam means, such cam means being shaped to cause a successive opening and closing of the cups when so engaged; a stationary platform extending under the open cups; means for delivering fruit sections from said platform into the path of the open cups; reaming means arranged to enter the closed cups and extract juice from the fruit sections therein and a rotatable carrier for said reaming means, the axes of said cup carrier and said reamer carrier being angularly disposed with respect to each other.

8. In a citrus fruit juice extracting machine, the combination of: a vertically arranged knife; means for conveying fruit against said knife to cut the fruit into halves; a curved separator entering between the sections of fruit; a horizontally arranged stationary platform at the discharge end of the separator; rotatable means for moving the cut fruit over said separator onto said platform; rotatable cup carrier means; a plurality of cups mounted on the underside of said carrier; means for opening said cups to receive the fruit sections on said platform; means for closing the cups during a portion of the rotation of the cup carrier; and reaming means arranged to enter the closed cups to extract juice from the fruit sections therein.

9. In a citrus fruit extracting machine, the combination of: a vertically arranged knife; means for conveying fruit against said knife to cut the fruit into halves; a curved separator entering between the sections of fruit; a horizontally arranged stationary platform at the discharge end of the separator; rotatable means for moving the cut fruit over said separator onto said platform, said rotatable means consisting of a plurality of curved arms, webs between said arms; rotatable cup carrier means; a plurality of cups mounted on the underside of said carrier; means for opening said cups to receive the fruit sections on said platform; means for closing the cups during a portion of the rotation of the cup carrier; and reaming means arranged to enter the closed cups to extract juice from the fruit sections therein.

10. For use in a machine for extracting juice from citrus fruit: a cup supporting member rotatable in a horizontal plane; a series of sectional cups mounted on said member extending downwardly therefrom; each cup consisting of a fixed section and a movable section; means for securing the fixed sections to said member; means for pivotally connecting the movable sections of each cup to its fixed section; a stationary cam; and cam engaging means on each movable cup section engageable with said cam to alternately open and close said cups.

11. For use in a machine for extracting juice from citrus fruit; a cup supporting member rotatable in a horizontal plane; a series of sectional cups mounted on said member extending downwardly therefrom; each cup consisting of a fixed section and a movable section; means for securing the fixed sections to said member; means for pivotally connecting the movable section of each cup to its fixed section; a stationary cam; cam engaging means on each movable cup section engageable with said cam to alternately open and close said cups; and means for moving fruit sections into the path of said cups when the cups are in open position.

12. For use in a machine for extracting juice from citrus fruit: a cup supporting member rotatable in a horizontal plane; a series of sectional cups mounted on said member extending downwardly therefrom; each cup consisting of a fixed section and a movable section; means for securing the fixed sections to said member; means for pivotally connecting the movable section of each cup to its fixed section; a stationary cam; cam engaging means on each movable cup section engageable with said cam to alternately open and close said cups, and means for moving fruit sections into the path of said cups when the cups are in open position; said last named means consisting of a stationary platform extending under a portion of the path of said cups, and rotatable means for moving the fruit sections on said platform.

13. In a citrus fruit juice extracting machine, the combination of: a rotatable cup carrier; means for rotating said carrier; sectional cups; means for securing one section of each cup to the underside of said carrier; a movable section of each cup pivotally connected to the section secured to the carrier; fixed cam means; means on each movable cup section engageable with said cam means, such cam means being shaped to cause a successive opening and closing of the cups when so engaged; a stationary platform extending under the open cups; said platform having a notch formed in one end thereof; means for delivering fruit sections from said platform into the path of the open cups; and reaming means arranged to enter the closed cups through the notched portion of the platform and extract juice from the fruit sections therein.

14. In a citrus fruit juice extracting machine, the combination of: a rotatable carrier; a plurality of split cups mounted on and depending downwardly from said carrier; means for rotating said carrier; means for opening and closing said cups; means for delivering fruit sections to said cups when in open position, a rotatable reamer carrier having its axis angularly disposed with relation to the axis of said first named carrier; reamers on said reamer carrier projecting upwardly therefrom and positioned to enter the cups when said cups are in closed position for extracting the juice from the fruit sections in the cups; means for rotating the reamer carrier and means for rotating said reamers; and stationary stripper means extending into a path adjacent the path of the reamers to engage fruit peels thereon.

15. In a fruit juice extracting machine: a vertical shaft; a rotatable cup carrier secured to said shaft; a plurality of inverted cups on said carrier; a second shaft angularly disposed with respect to said first named shaft; a reamer carrier mounted on said second shaft; a plurality of reamers on said reamer carrier; a gear on the lower end of the vertical shaft; a gear mounted on the reamer carrier meshing with said first named gear; a depending circular flange on said cup carrier; and a universal joint member on said reamer carrier extending into and engageable with said flange.

16. In a fruit juice extracting machine: a vertical shaft; a rotatable cup carrier secured to said shaft; a plurality of inverted cups on said carrier; a second shaft angularly disposed with respect to said first named shaft; a reamer carrier mounted on said second shaft; a plurality of reamers on said reamer carrier; a depending circular flange on said cup carrier; and a universal joint member on said reamer carrier extending into and engageable with said flange.

17. In a fruit juice extracting machine: a rotatable shaft; a cup carrier mounted on said shaft; a plurality of cups mounted on said carrier depending therefrom; a second shaft angularly disposed with relation to said first named shaft; the axes of said shafts intersecting each other; a reamer carrier mounted on said second shaft; a plurality of reamers on said reamer carrier projecting upwardly and positioned to enter the cups during a portion of their path of travel; and means for rotating said reamers.

19. In a fruit juice extracting machine; a rotatable shaft; a cup carrier mounted on said shaft; a plurality of cups mounted on said carrier extending outwardly from the face thereof; a second shaft angularly disposed with relation to said first named shaft; the axes of said shafts intersecting each other; a reamer carrier mounted on said second shaft; a plurality of reamers on said reamer carrier projecting outwardly from the face thereof and positioned to enter the cups on the cup carrier during a portion of their path of travel, and means for rotating said reamers.

19. In a fruit juice extracting machine: a rotatable shaft; a cup carrier mounted on said shaft and rotatable therewith; a plurality of cups mounted on said carrier extending outwardly from the face thereof; a second rotatable shaft angularly disposed with relation to said first named shaft; the axes of said shafts intersecting each other; a carrier mounted on said second shaft and rotatable therewith; a plurality of cup entering members on said last named carrier projecting outwardly from the face thereof a fixed distance and positioned to enter the cups on the cup carrier only during a portion of the rotation of said second carrier.

WILLIAM O. BROWN.